United States Patent [19]

Flemming

[11] Patent Number: 4,611,845

[45] Date of Patent: Sep. 16, 1986

[54] METHOD AND APPARATUS FOR PICKING UP A BATCH OF ARTICLES

[75] Inventor: John P. W. Flemming, Hopewell Township, Mercer County, N.J.

[73] Assignee: AT&T Technologies, Inc., Berkeley Heights, N.J.

[21] Appl. No.: 626,088

[22] Filed: Jun. 29, 1984

[51] Int. Cl.$^4$ .............................................. B66G 1/44
[52] U.S. Cl. ................................. 294/87.1; 294/87.28
[58] Field of Search ................. 294/87.1, 87.12, 87.24, 294/87.26, 87.28, 81.1, 86.4, 88, 62, 63.1, 65, 67.1, 67.3, 67.33, 67.31, 67.32; 414/741, 416; 269/115

[56] References Cited

U.S. PATENT DOCUMENTS

| | | | |
|---|---|---|---|
| 1,727,979 | 9/1929 | Hunt | 269/115 |
| 3,186,751 | 6/1965 | Dardaine | 294/87.1 |
| 3,438,515 | 4/1969 | Nowicki | 214/1 |
| 4,091,937 | 5/1978 | Calvert | 294/87.28 |
| 4,105,241 | 8/1978 | Mee | 294/86 |

Primary Examiner—James B. Marbert
Attorney, Agent, or Firm—R. B. Levy

[57] ABSTRACT

A robotic hand (10,36) for batch pickup of articles (12,38) arranged in an array of columns and rows includes a plate (14,40) having a plurality of article-receiving passages (16,42) therethrough. Each article (12,38) is captured within separate one of the passage (16,42) by at least one gripping member (18,44,46) which includes a strip (20,48,52) having a depending finger (22,50,54) extending into the passage. The gripping member is moved to capture the article (12,38) therein between the finger and the passage wall. The gripping members (18,44,46) are pivotally connected to rotary actuators (26,64) by linkage bars (32,58,62) which displace the gripping members (18,44,46) across the plate (14,40) to capture each article (12,38) within a corresponding plate passages (16,42).

13 Claims, 6 Drawing Figures

METHOD AND APPARATUS FOR PICKING UP A BATCH OF ARTICLES

TECHNICAL FIELD

This invention relates generally to methods and apparatus for capturing a plurality of articles arranged in an array of columns and rows.

BACKGROUND OF THE INVENTION

Robots are increasingly being used in many industrial applications to transport articles from one location to another. Sequential lifting and placing of articles can easily be accomplished by robots to free manual labor from such tedious and boring tasks. Moreover, robots can effectively operate in dirty, hot and even hazardous locations where environmental conditions would otherwise limit or preclude the use of a human operator. There are additional advantages to using robots for article handling. Robots can be programmed to sequentially pick and place articles with extremely high positioning accuracy, thereby increasing manufacturing productivity. Further, robots can operate unattended, permitting their use at night or on weekends.

Present day article handling robots, although they differ as to their specific construction, generally include an articulated arm whose individual segments are each movable about a separate axis along a preprogrammed path. Electric, hydraulic or pneumatic motors are provided to move each segment of the articulated arm under the control of a robot control system. A robotic hand or gripper is provided at the end of the arm for gripping the article to be transported by the robot. In the past, robotic hands have been designed for gripping a single article. Thus, to transport an array of articles, the robot must individually pick and place each article of the array in sequence. Piecemeal transportation of the articles of the array in this fashion is time consuming and inefficient.

Accordingly, there is a need for a technique for batch pickup of articles arranged in an array.

SUMMARY OF THE INVENTION

The aforementioned problem has been overcome by the method of the present invention for batch pickup of articles. The method includes the steps of positioning a plate having a plurality of passages therethrough to locate each article in a passage and moving a plurality of first members, each having a finger depending therefrom and projecting into a passage, to displace each finger to capture an article between the finger and a wall of the passage.

DETAILED DESCRIPTION

Figure 1:
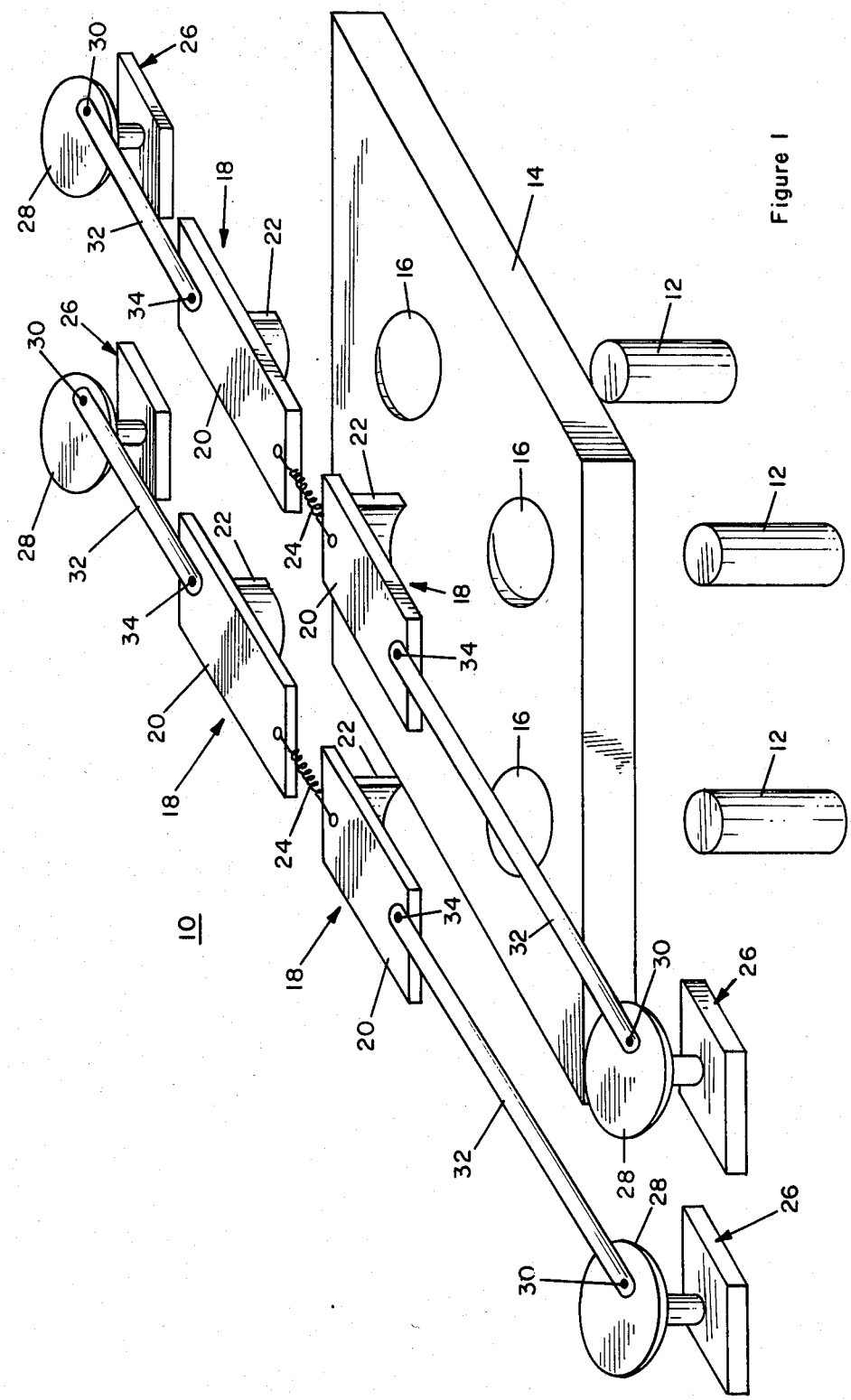
FIG. 1 is an exploded perspective view of an embodiment of a robotic hand according to the present invention for batch pickup of cylindrical articles.

FIG. 1 illustrates an exploded perspective view of an embodiment of a robotic hand 10 for batch gripping of a plurality of cylindrical articles 12—12 arranged in an array. To simplify the discussion of the robotic hand 10, the articles 12—12 have been arranged in a 2 horizontal row by 2 vertical column array. However, as will become apparent to those skilled in the art from the following description, the robotic hand 10 can easily be adapted to grip a plurality of articles arranged in an N row by an M column array, where N and M are integers.

The robotic hand 10 includes a plate 14 which is of sufficient size to completely overlie the array of articles 12—12. A plurality of circular passages 16—16, arranged in an array the same as the articles 12—12, each extend through the plate 14 between the top and bottom major surfaces thereof. Each passage 16 is larger in diameter than each article 12 and is positioned in registration therewith for receiving the article therein.

Figure 2:
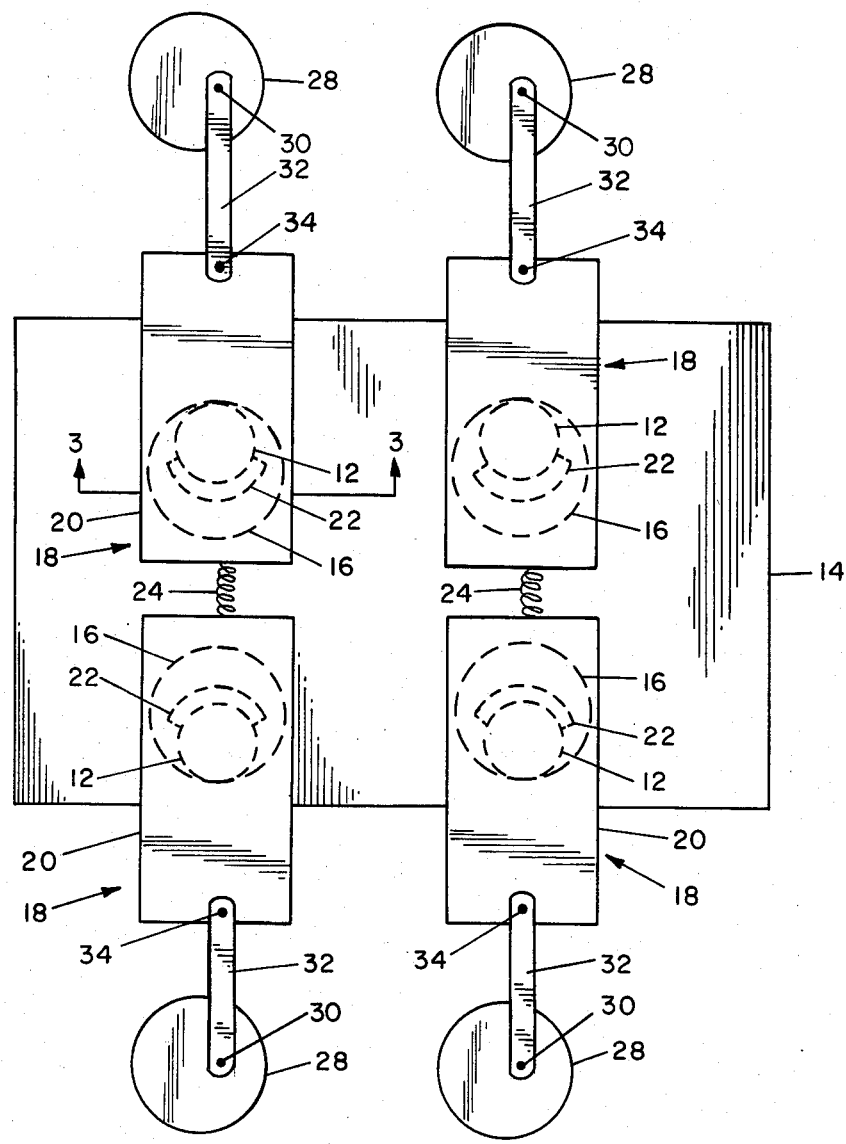
FIG. 2 is a plan view of the apparatus of FIG. 1.
Figure 3:
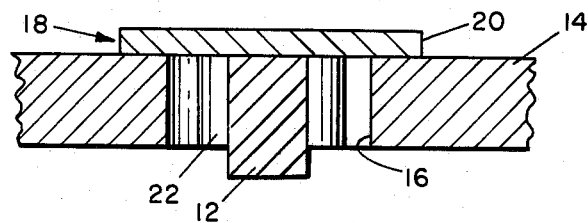
FIG. 3 is a cross-sectional view taken along the plane 3—3 of FIG. 2.

A plurality of gripping members 18—18 overlie the plate 16. Each gripping member 18 comprises a strip 20 which is associated with a separate one of the passages 16—16. The strip 20 has a thin, flexible arcuate finger 22 which projects vertically downwardly therefrom into the passage 16 therebeneath as best illustrated in FIG. 3. In practice, when the articles 12—12 and the passages 16—16 are arranged in a 2×M array as exemplified by the 2×2 array shown in FIGS. 1-3, the strip 20 overlying one of the pair of passages 16—16 in each column is in vertical alignment with the strip overlying the other passage in the column. The arcuate finger 22 of each of a pair of vertically aligned strips 20—20 is in opposed, back-to-back relationship with the finger of the other strip as illustrated in FIG. 2. A compression spring 24 is interposed between each of the pair of strips 20—20 in the column to yieldably bias them apart.

Referring to FIGS. 1 and 2, each gripping member 18 is selectively displaced across the plate 14 by a separate one of a plurality of rotary actuators 26—26. Each rotary actuator 26 may either be hydraulic, pneumatic or electric and includes an output drive wheel 28 which rotates clockwise or counterclockwise depending upon the drive input to the actuator. The drive wheel 28 of each rotary actuator 24 is pivotally connected by a pin 30 to one end of a linkage bar 32 so that the linkage bar and drive wheel form an eccentric. The opposite end of the linkage bar 32 is pivotally connected by a pin 34 to the end of the strip 20 of an associated one of the gripping members 18—18. Each linkage bar 32 reciprocates a corresponding gripping member 18 across the plate 14 in response to the rotation of the drive wheel 28 of an associated one of the rotary actuators 26—26.

Batch pickup of the articles 12—12 of the array is achieved by activating each of the rotary actuators 26—26 to displace the gripping members 18—18 of each aligned pair towards each other. The strip 20 of each gripping member 18 moves to displace the finger 22 to permit an associated one of the articles 12—12 to be received in the corresponding passage 16. Upon receipt of each of the articles 12—12 in the associated passage 16, then the rotary actuators 26—26 are activated to move each of the gripping members 18—18 in the opposite direction so that the finger 22 of each strip 20 captures the article 12 between the wall of the passage 16 and the finger.

Usually the rotary actuators 26—26 are activated simultaneously so that the articles 12—12 of the array are simultaneously captured by the gripping members 18—18. However under certain circumstances not all of the articles 12—12 may be captured at once. For example, some of the articles 12—12 may have been rejected during an inspection thereof. Capturing of less than all the articles 12—12 may be achieved by selectively activating only those rotary actuators 26—26 associated with the gripping members 18—18 for gripping the selected articles 12—12.

To mount the robotic hand 10 to a robot, the rotary actuators 26—26 and the plate 14 are mounted to a frame (not shown). The frame is then secured to the end of the robotic arm (not shown) for movement therewith. In this way, the plate 14 can be moved to pick up as well as transport the articles 12—12.

The robotic hand 10, while primarily designed for batch pickup of cylindrical articles 12—12, can also be employed for batch pickup of articles of various geometries arranged in an array. To facilitate batch pickup of such articles, the shape of each plate passage 16 and the shape of the finger 22 of the strip 20 of each gripping member 18 is selected in accordance with the shape of the article to be gripped. For example, if the articles were hexagonally, octagonally or ovally shaped, then each finger 22 and each passage 16 would be shaped accordingly.

An important attribute of the robotic hand 10 is its ability to maintain the spacing between the articles 12—12 during gripping thereof. Since the plate passages 16—16 are arranged in an array the same as the articles 12—12, the spacing between the plate passages corresponds to the spacing between the individual articles 12 of the array. Thus, as each article 12 is gripped in a corresponding passage 16, the spacing between articles does not vary significantly if at all. Further, if the articles 12—12 are slightly misaligned, but are still spaced for receipt in the passages 16—16, then the robotic hand 10 advantageously aligns the articles during gripping thereof.

Figure 4:
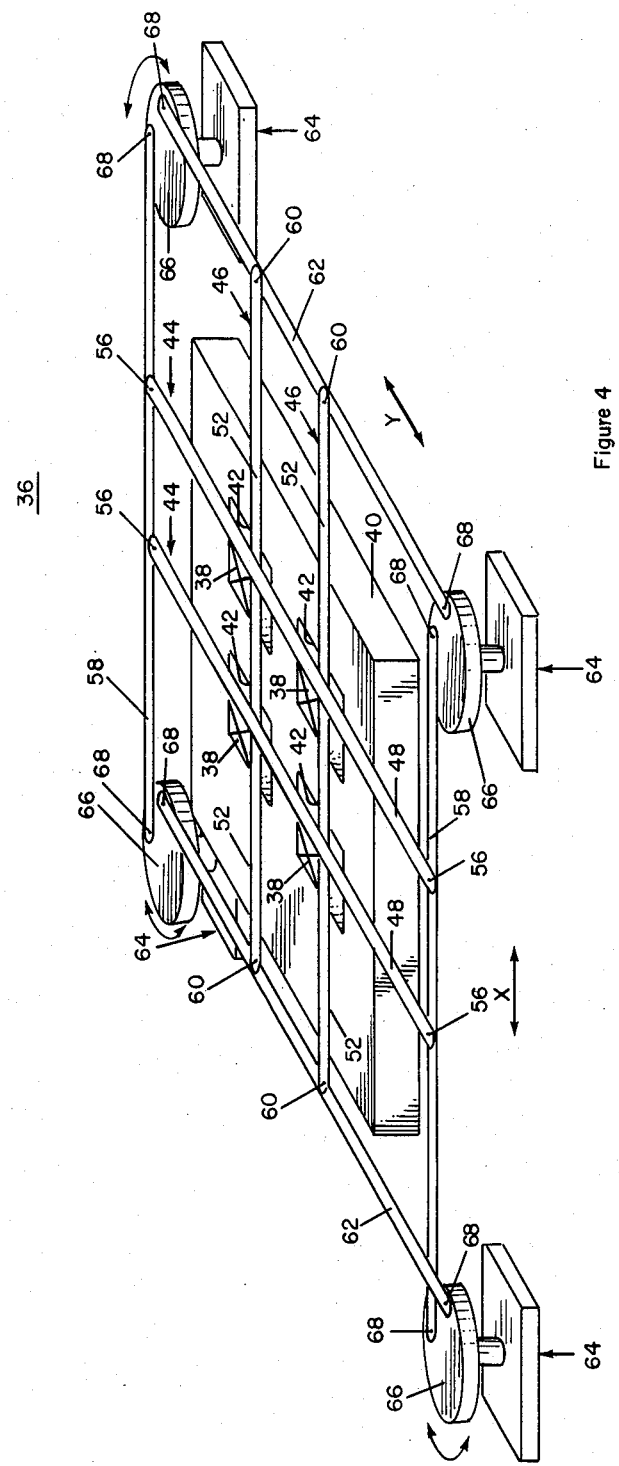
FIG. 4 is a perspective view of an exemplary embodiment of a robotic hand for batch gripping of rectangular articles.

FIG. 4 is a perspective view of an embodiment of a robotic hand apparatus 36 for gripping a plurality of rectangularly shaped articles 38—38 arranged in an array. Like the cylindrical articles 12—12 of FIGS. 1-3, the rectangular articles 38—38 of FIG. 4 have been arranged in a 2 row by 2 column array for the purpose of simplifying the description of the robotic hand 36. Those skilled in the art will appreciate from the following description that the robotic hand 10 can easily be adapted to releasably grip a plurality of rectangularly shaped articles 38—38 arranged in an N×M array.

Figure 5:
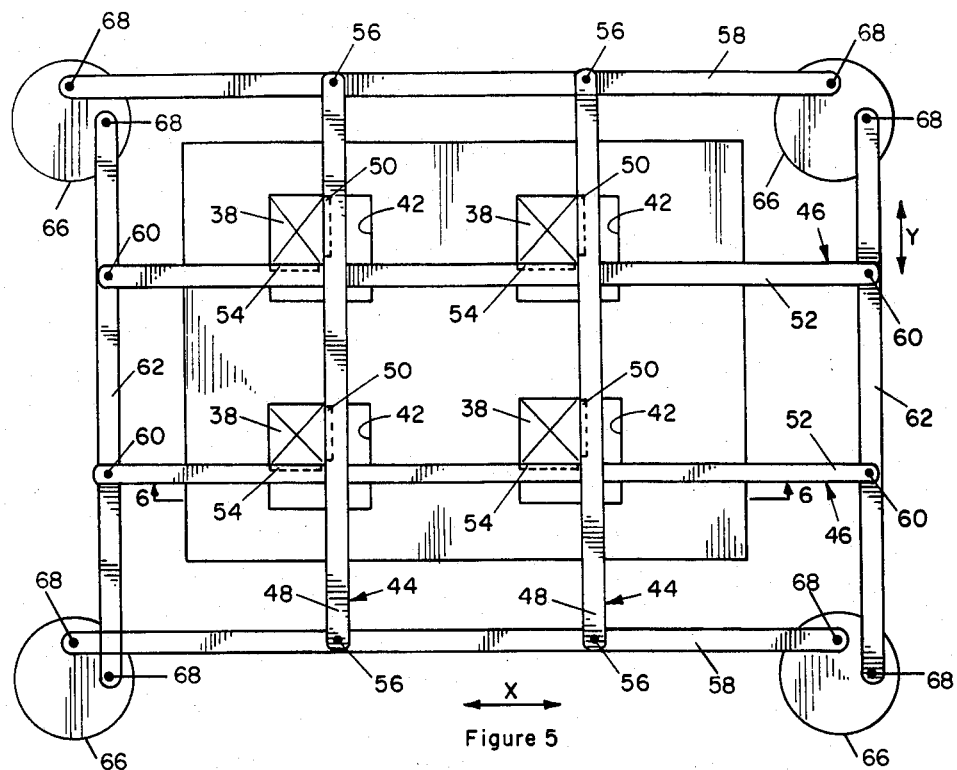
FIG. 5 is a plan view of the apparatus of FIG. 4.
Figure 6:
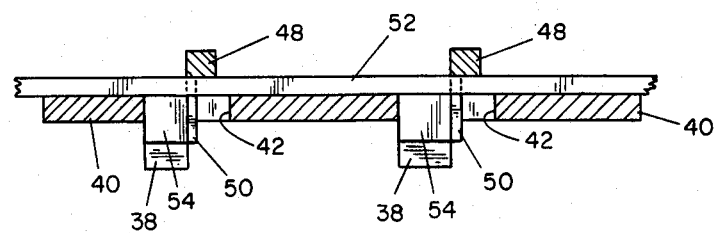
FIG. 6 is a cross-sectional view taken along the plane 6—6 of FIG. 5.

The robotic hand 36 comprises a plate 40 sized large enough to overlie an array of articles 38—38. The plate 40 has a plurality of rectangular passages 42—42 therethrough arranged in an array identical to the array of articles 38—38. Each passage 42 is sized larger than the article 38 to be received therein. A first and second group of gripping members 44—44 and 46—46, respectively, are provided for gripping the articles 38—38 in the passages 42—42. Each of the first group of gripping members 44—44 comprises a strip 48 which extends across the plate 40 to overlie each of the passages 42—42 in a separate one of the columns of the array of passages. Turning now to FIGS. 5 and 6, each strip 48 has a plurality of depending, planar, flexible fingers 50 which each extend into a separate one of the passages 42—42 in the associated column, so that each finger 50 lies between a first pair of opposing walls of the passage. The gripping finger 50 serves to urge the article 38 against the passage wall opposite the finger.

Each of the second group of gripping members 46—46 comprises a strip 52 which extends across the plate 40 above the strip 48 of each of the first group of gripping members 44—44 to overlie the passages 42—42 in a separate one of rows of the matrix array of passages. Thus, each strip 52 is substantially perpendicular to each strip 48. Each strip 52 has a plurality of depending, planar, flexible fingers 54—54 which each extend to a separate one of the passages 42—42 in the row. Each finger 54 extending into each passage 42 is substantially perpendicular to the finger 50 extending therein so as to lie between the other pair of opposing walls of the passage. The gripping finger 50 serves to urge the article 38 against the passage wall opposite the finger. Thus, the fingers 50 and 54 serve to urge the article 38 into a corner of the passage 42. The width of each of the fingers 50 and 54 and their respective locations on the strips 48 and 52, respectively, are chosen to prevent any interference therebetween during movement thereof across each of the passages 42—42.

Each strip 48 of each gripping member 44 has each of its ends pivotally connected by a pin 56 to each of a first pair of parallel, spaced-apart linkage bars 58—58. The strip 52 of each of the gripping members 46—46 has each of its ends pivotally connected by a pin 60 to each of a second pair of parallel, spaced-apart linkage bars 62—62 which are each perpendicular to the linkage bars 58—58.

Referring to FIGS. 4 and 5, the robotic hand 10 includes four rotary actuators 64—64, each spaced from a separate one of the corners of plate 40 for reciprocating the first and second group of gripping members 44—44 and 46—46 in a first direction along the x and y axes, respectively. Each rotary actuator 64 is constructed similar to each of the rotary actuators 26—26 of FIGS. 1 and 2, and each includes an output drive wheel 66 which rotates in the horizontal plane of the linkage bars 58—58 and 62—62. The direction of rotation of the output drive wheel 66 of each rotary actuator 64 is dependent on the drive input supplied to the actuator 64 by a control system (not shown).

An end of one of the linkage bars of each pair of linkage bars 58—58 and 62—62, respectively, is pivotally connected by a pin 68 to the drive wheel 66 of a separate one of the rotary actuators 64—64 so as to be eccentric thereto. When the rotary actuators 64—64 are jointly actuated so that the drive wheel 66 of each is made to rotate in a counterclockwise direction, then both of the linkage bars 58—58 move in a first direction along the x axis, while both of the linkage bars 62—62 simultaneously move in a first direction along the y axis. The joint movement of the linkage bars 58—58 along the x axis causes the strip 48 of each of the gripping members 44—44 to move across each of the passages 42—42 in an associated column. The gripping finger 50 projecting into each passage 42 is urged against the article 38 to capture the article between a first passage wall and the finger. Joint displacement of the linkage bars 62—62 along the y axis causes the strip 52 of each of the gripping members 46—46 to move across the passages 42—42 in an associated row. As each strip 52 is displaced across the passages 42—42 in the row, the finger 54 projecting into each passage 42 is urged against the article 38 to capture the article between the finger and a second passage wall adjacent to, and perpendicular with, the first passage wall. Thus, the fingers 50 and 54 capture the article 38 against a corner of the passage 42.

When the drive input to each rotary actuator 64 is altered to reverse the direction of rotation of its output drive wheel 66, the direction of movement of the linkage bars 58—58 and linkage bars 62—62 along the x and y axes, respectively, is reversed. In turn, the strips 48 and 52 of each of the gripping members 44—44 and the gripping members 46—46, respectively, are displaced in a reverse direction along the x and y axes, respectively. The gripping fingers 50 and 54 projecting into each of the passageways 42—42 are thus moved away from the article 38 therein and out of gripping engagement therewith.

The robotic hand 36 thus far described could be constructed with only a single group of gripping members 44—44. However, there is an advantage to providing the robotic hand with a second group of gripping members 46—46. The gripping members 46—46 operate in unison with the gripping members 44—44 to maintain the spacing between the articles 38—38 substantially constant during gripping thereof by urging each of the articles 38—38 into the same corner in each of the passages 42—42. Since the spacing between the plate passages 42—42 remains fixed, the spacing between each of the articles 38—38 gripped therein remains fixed. The robotic hand 36 may also serve to align the articles 38—38 should they be initially slightly misaligned. Without the second group of gripping members 46—46, exactly where each article 38 is captured in the passage 42 by the finger 50 associated one of the gripping members 44—44 may vary slightly, thus undesirably altering the spacing between the articles 42—42.

Although not shown, the robotic hand 36 could also be constructed so that the plate 40 is displaced by the rotary actuators 64—64 with the gripping members 46—46 and 48—48 remaining stationary rather than vice-versa as shown. Thus, by moving the plate 40, each article 38 could be captured between the fingers 50 and 54 and the walls of the passage 42.

In contrast to the robotic hand 10 of FIGS. 1 and 3, the robotic hand 36 of FIGS. 4-6 is incapable of gripping a selected one of the articles 38—38 of the array. Rather, the robotic hand 36 grips all of the articles 38—38 of the array at once. However, this disadvantage is not believed to be significant. Further, in applications where selective gripping of individual articles is not required, the robotic hand 36 of FIGS. 4, 5 and 6 affords an advantage over the robotic hand 10 of FIGS. 1-3. The robotic hand 36 requires only four rotary actuators 64—64 regardless of the number of gripping members 44—44 and 46—46 employed, whereas the robotic hand 10 requires a separate rotary actuator 26 for each gripping member 18. Like robotic hand 10 of FIGS. 1-3, the robotic hand 36 of FIGS. 4-6 is typically attached to the end of the arm of a robot (not shown) by a frame (not shown) which would mount the rotary actuators 64—64 and the plate 40.

It is to be understood that the embodiments described herein are merely illustrative of the principles of the invention. Various modifications and changes may be made thereto by persons skilled in the art which will embody the principles of the invention and fall within the spirit and scope thereof.

What is claimed is:

1. A method for capturing a plurality of articles arranged in an array of columns and rows, the method comprising the steps of:
   positioning a plate, having a plurality of passages therethrough, to locate each article in a passage; and
   selectively moving a plurality of first members, each having a first finger depending therefrom and projecting into a passage, to displace each finger to selectively capture an article between said finger and a wall of the passage.

2. The invention according to claim 1 comprising the step of:
   selectively moving a plurality of second members, each having a second finger depending therefrom and projecting into said passage, in a direction perpendicular to said first plurality of members to displace each second finger of said second member to selectively capture the article between the second finger and the wall of the passage.

3. The invention according to claim 2 characterized by each article and each passage being rectangular in shape and each article lying between the first and second fingers of said first and second members, respectively, and a respective wall of the passage, and wherein said first and second members are moved to displace each finger thereof to capture the article between each of the fingers and the respective wall of the passage.

4. The invention according to claim 2 wherein the first and second members are moved in unison.

5. A robotic hand for gripping articles arranged in an array of columns and rows comprising:
   a plate having a plurality of passages therethrough, each passage located and sized to receive a separate one of the articles;
   a plurality of gripping means each extending into a separate one of the plate passages; and
   moving means for selectively moving a separate one of said gripping means to selectively capture a selected one of said articles in the associated one of said plate passages.

6. The invention according to claim 5 wherein said moving means comprises a plurality of rotary actuators, each individually connected to the gripping means to impart reciprocal motion thereto.

7. The invention according to claim 5 characterized by a first and second group of gripping means, each of the gripping means in said first group extending into all the passages in a separate one of the columns of the array of passages for movement across each passage and each of the gripping means in said second group extending into all the passages in a separate one of the rows of the array of passages for movement across each passage so that the gripping means of said first and second group of gripping means extending into each passage cooperate to capture the articles between the respective gripping means and the wall of the passage.

8. The invention according to claim 7 wherein said moving means comprises:
   a first pair of spaced, parallel linkage bars each pivotally connected to a separate one of the ends of said first group of gripping means;
   a second pair of spaced, parallel linkage bars each perpendicular to each of the first pair of linkage bars and each pivotally connected to a separate one of the ends of said second group of gripping means; and four rotary drive means, each pivotally connected between the end of a separate one of the linkage bars of the first pair and the end of a separate one of the linkage bars of the second pair for jointly displacing the linkage bars of each first pair orthogonally to the second pair to urge an associated one of the gripping means of said first and second group against the article in each of said passages.

9. The invention according to claim 5 wherein each gripping means comprises:
a strip overlying a separate one of said passages; and
a flexible finger depending from said strip and projecting into the plate passage underlying said strip.

10. The invention according to claim 9 characterized by each article being cylindrical and each passage being a cylindrical opening, and wherein each flexible finger of each strip is arcuately shaped to bear against an associated one of said cylindrically shaped articles.

11. The invention according to claim 7 wherein:
each gripping means of said first group comprises:
a first strip overlying each of the passages in a separate column of passages; and
a plurality of first flexible fingers each depending from said first strip into a separate one of the passages in the column to bear against the article received therein;
and wherein each gripping means of said second group comprises:
a second strip overlying each of the passages in a separate row of passages; and
a plurality of second flexible fingers, each depending from said second strip into a separate one of the passages in the row to bear against the article recieved therein.

12. An apparatus for simultaneously capturing a plurality of articles arranged in an array of columns and rows, the apparatus comprising:
a plate having a plurality of passages therethrough wherein each passage is sized to receive an article therein;
a plurality of planar members positioned proximate to the plate and mounted for selective movement parallel thereto; and
a finger depending from each planar member and projecting into a passage to capture an article between the finger and the wall of the passage upon movement of the planar member.

13. A robotic hand for batch pickup of articles arranged in an array of columns and rows, comprising:
a plate having a plurality of passages therethrough sized to receive an article of the array in respective passages;
a plurality of gripping members, each including a strip which overlies a separate one of said passages and adapted for movement thereacross, and each strip having a depending, flexible finger extending therefrom into a separate one of said passages; and
means for selectively moving each said gripping member across said plate to capture the article received in an associated one of said plate passages between the finger and the wall of the passage.

* * * * *